(12) United States Patent
Brons et al.

(10) Patent No.: US 10,580,439 B2
(45) Date of Patent: *Mar. 3, 2020

(54) DEVICES INCLUDING AT LEAST ONE MULTILAYER ADHESION LAYER

(71) Applicant: SEAGATE TECHNOLOGY LLC, Cupertino, CA (US)

(72) Inventors: Justin Brons, Savage, MN (US); Tong Zhao, Eden Prairie, MN (US); Yuhang Cheng, Edina, MN (US); Dimitar V. Dimitrov, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/160,661

(22) Filed: Oct. 15, 2018

(65) Prior Publication Data

US 2019/0051319 A1 Feb. 14, 2019

Related U.S. Application Data

(63) Continuation of application No. 15/073,396, filed on Mar. 17, 2016, now Pat. No. 10,102,872.

(Continued)

(51) Int. Cl.
*G11B 5/31* (2006.01)
*G11B 5/00* (2006.01)

(52) U.S. Cl.
CPC ............ *G11B 5/314* (2013.01); *G11B 5/3133* (2013.01); *G11B 2005/0021* (2013.01)

(58) Field of Classification Search
None
See application file for complete search history.

(56) References Cited

U.S. PATENT DOCUMENTS 6,144,098 A 11/2000 Iyer
7,773,330 B2 8/2010 Itagi
(Continued)

FOREIGN PATENT DOCUMENTS

EP 0580368 1/1994
JP 2011-008899 1/2011
(Continued)

OTHER PUBLICATIONS

Sato et al., "Evaluation of Adhesion Materials for Gold Line-and-Space Surface Plasmon Antenna on SO1-MOS Photodiode", Silicon Nanoelectronics Workshop (SNW), 2010, *IEEE*, Piscataway, NJ, USA, Jun. 13, 2010, pp. 1-2.

(Continued)

*Primary Examiner* — Brian M Butcher
(74) *Attorney, Agent, or Firm* — Mueting, Raasch & Gebhardt, P.A.

(57) ABSTRACT

Devices that include a near field transducer (NFT), the NFT having at least one external surface; and at least one multilayer adhesion layer positioned on at least a portion of the at least one external surface, the multilayer adhesion layer including a first layer and a second layer, with the second layer being in contact with the portion of the at least one external surface of the NFT, the first layer including: yttrium (Y), scandium (Sc), zirconium (Zr), hafnium (Hf), silicon (Si), boron (B), tantalum (Ta), barium (Ba), aluminum (Al), titanium (Ti), niobium (Nb), calcium (Ca), beryllium (Be), strontium (Sr), magnesium (Mg), lithium (Li), or combinations thereof; and the second layer including: lanthanum (La), boron (B), lutetium (Lu), aluminum (Al), deuterium (D), cerium (Ce), uranium (U), praseodymium (Pr), yttrium (Y), silicon (Si), iridium (Ir), carbon (C), thorium (Th), scandium (Sc), titanium (Ti), vanadium (V), phosphorus (P), barium (Ba), europium (Eu), or combinations thereof.

20 Claims, 3 Drawing Sheets

Related U.S. Application Data

(60) Provisional application No. 62/137,321, filed on Mar. 24, 2015.

(56) References Cited

U.S. PATENT DOCUMENTS

| | | | |
|---|---|---|---|
| 8,040,761 | B2 | 10/2011 | Kawamori |
| 8,149,657 | B2 | 4/2012 | Huang |
| 8,248,897 | B2 | 8/2012 | Shimazawa |
| 8,339,740 | B2 | 12/2012 | Zou |
| 8,343,364 | B1 | 1/2013 | Gao |
| 8,351,151 | B2 | 1/2013 | Katine |
| 8,385,158 | B1 | 2/2013 | Hu |
| 8,400,902 | B2 | 3/2013 | Huang |
| 8,427,925 | B2 | 4/2013 | Zhao |
| 8,599,656 | B2 | 12/2013 | Jin |
| 8,773,956 | B1 | 7/2014 | Wang |
| 8,787,129 | B1 | 7/2014 | Jin |
| 8,790,527 | B1 | 7/2014 | Luo |
| 8,830,800 | B1 | 9/2014 | Pitcher |
| 8,842,391 | B2 | 9/2014 | Zou |
| 8,934,198 | B2 | 1/2015 | Zou |
| 8,958,271 | B1 | 2/2015 | Peng |
| 8,971,161 | B2 | 3/2015 | Cheng |
| 9,129,620 | B2 | 9/2015 | Cheng |
| 10,102,872 | B2 * | 10/2018 | Brons .......... G11B 5/3133 |
| 2010/0104768 | A1 | 4/2010 | Xiao |
| 2010/0123965 | A1 | 5/2010 | Lee |
| 2010/0157745 | A1 | 6/2010 | Okada |
| 2010/0214685 | A1 | 8/2010 | Seigler |
| 2010/0321814 | A1 | 12/2010 | Zou |
| 2010/0329085 | A1 | 12/2010 | Kawamori |
| 2011/0002199 | A1 | 1/2011 | Takayama |
| 2011/0096431 | A1 | 4/2011 | Hellwig |
| 2011/0205863 | A1 | 8/2011 | Zhao |
| 2011/0209165 | A1 | 8/2011 | Tsai |
| 2012/0105996 | A1 | 5/2012 | Katine |
| 2012/0314549 | A1 | 12/2012 | Lee |
| 2013/0100783 | A1 | 4/2013 | Ostrowski |
| 2013/0107679 | A1 | 5/2013 | Huang |
| 2013/0148485 | A1 | 6/2013 | Jin |
| 2013/0170332 | A1 | 7/2013 | Gao |
| 2013/0235707 | A1 | 9/2013 | Zhao |
| 2013/0279314 | A1 | 10/2013 | Peng |
| 2013/0279315 | A1 | 10/2013 | Zhao |
| 2013/0288077 | A1 | 10/2013 | Dhawam |
| 2013/0330573 | A1 | 12/2013 | Zhao |
| 2014/0004384 | A1 | 1/2014 | Zhao |
| 2014/0251948 | A1 | 9/2014 | Zhao |
| 2014/0254335 | A1 | 9/2014 | Gage |
| 2014/0254336 | A1 | 9/2014 | Jandric |
| 2014/0307534 | A1 | 10/2014 | Zhou |
| 2014/0313872 | A1 | 10/2014 | Rawat |
| 2014/0374376 | A1 | 12/2014 | Jayashankar |
| 2014/0376342 | A1 | 12/2014 | Wessel |
| 2014/0376349 | A1 | 12/2014 | Cheng |
| 2015/0043319 | A1 | 2/2015 | Kasuya |
| 2015/0063086 | A1 | 3/2015 | Wierman |
| 2015/0131418 | A1 | 5/2015 | Huang |
| 2015/0179194 | A1 | 6/2015 | Cheng |
| 2016/0133291 | A1 | 5/2016 | Chen |
| 2016/0260448 | A1 | 9/2016 | Zhao |
| 2016/0284365 | A1 | 9/2016 | Brons |

FOREIGN PATENT DOCUMENTS

| | | |
|---|---|---|
| JP | 2013-122811 | 6/2013 |
| WO | WO 2013/163195 | 10/2013 |
| WO | WO 2013/163470 | 10/2013 |

OTHER PUBLICATIONS

Vogt, K.W. et al., "Characterization of Thin Titanium Oxide Adhesion Layers on Gold Resistivity, Morphology, and Composition", Surface Science, North-Holland, Amsterdam, NL, vol. 301, No. 1-3, Jan. 10, 1994, pp. 203-213.

Metallization: "Metallization"; chapter 5, In: Kris v. Srikrishnan and Geraldine C. Schwartz: "Handbook of Semiconductor Interconnection Technology, Second Edition", 2006, CRC Press, Boca Raton, FL, USA, XP002711255, ISBN:978-1-4200-1765-6, pp. 311-382, Section 5.4.1.2 Adhesion; p. 320.

PCT International Search Report and Written Opinion for International Application No. PCT/US2013/038280 dated Aug. 13, 2012 (10 pages).

Notification Concerning Transmittal of International Preliminary Report on Patentability for PCT/US2013/038280 dated Nov. 6, 2014 (6 pages).

PCT International Search Report and Written Opinion for PCT/US2016/034628 dated Aug. 24, 2016 (14 pages).

PCT International Search Report and Written Opinion for PCT/US2016/034620 dated Aug. 18, 2016 (13 pages).

* cited by examiner

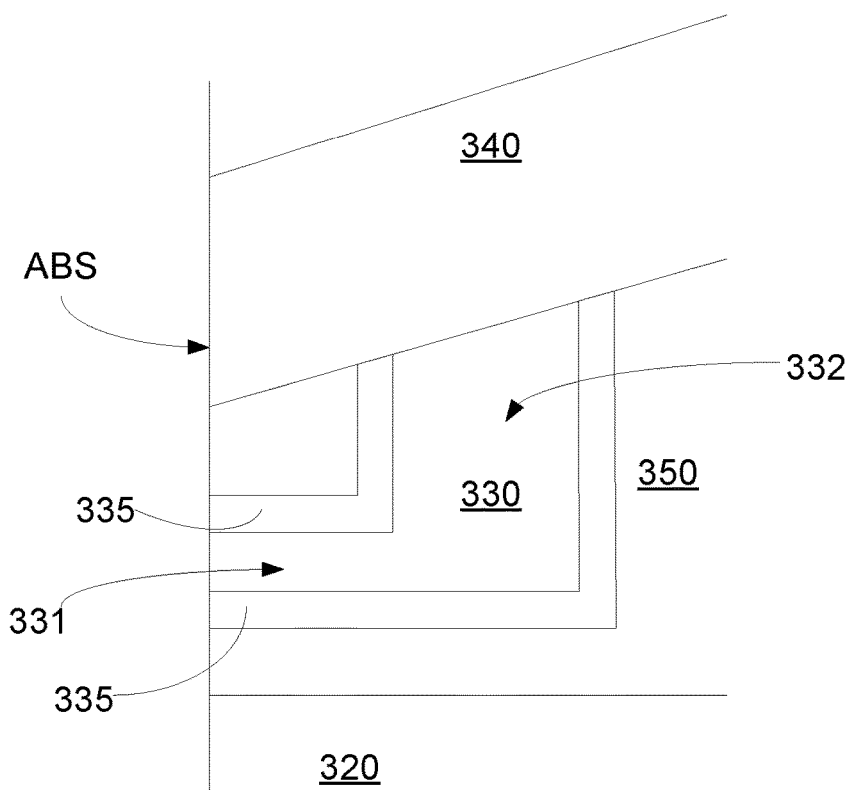
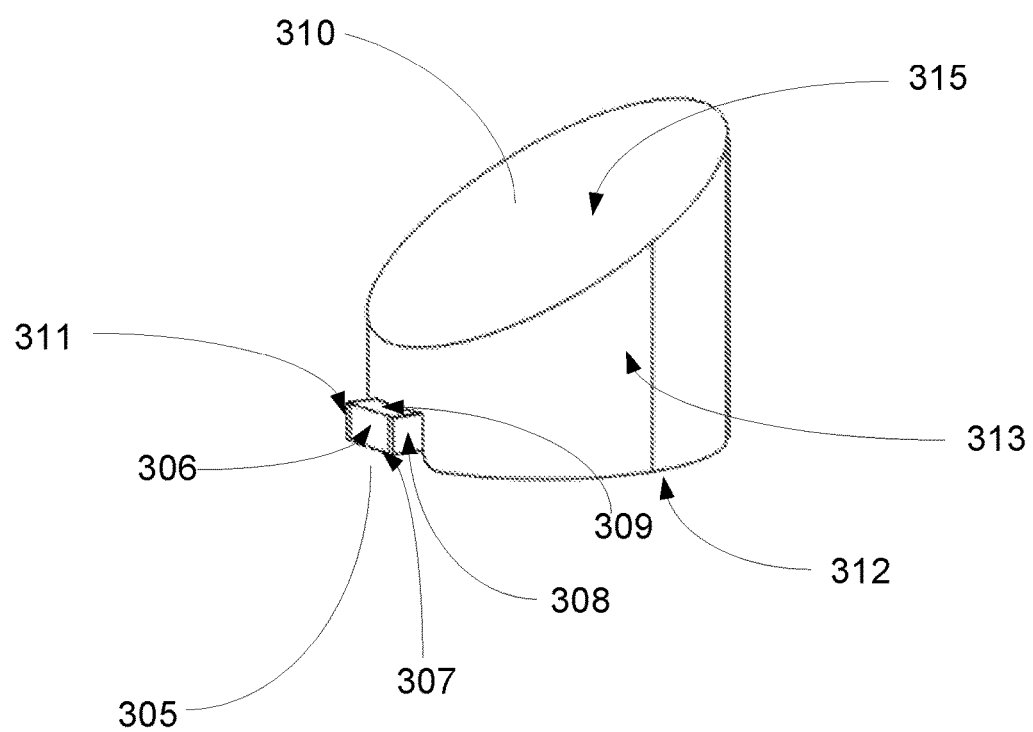

DEVICES INCLUDING AT LEAST ONE MULTILAYER ADHESION LAYER

CROSS REFERENCE TO RELATED APPLICATION

This application claims priority to U.S. Provisional Application No. 62/137,321 entitled NEAR FIELD TRANSDUCER INCLUDING MULTILAYER ADHESION LAYER, filed on Mar. 24, 2015, the disclosure of which is incorporated herein by reference thereto.

SUMMARY

Disclosed are devices that include a near field transducer (NFT), the NFT having at least one external surface; and at least one multilayer adhesion layer positioned on at least a portion of the at least one external surface, the multilayer adhesion layer including a first layer and a second layer, with the second layer being in contact with the portion of the at least one external surface of the NFT, the first layer including: yttrium (Y), scandium (Sc), zirconium (Zr), hafnium (Hf), silicon (Si), boron (B), tantalum (Ta), barium (Ba), aluminum (Al), titanium (Ti), niobium (Nb), calcium (Ca), beryllium (Be), strontium (Sr), magnesium (Mg), lithium (Li), or combinations thereof; and the second layer including: lanthanum (La), boron (B), lutetium (Lu), aluminum (Al), deuterium (D), cerium (Ce), uranium (U), praseodymium (Pr), yttrium (Y), silicon (Si), iridium (Ir), carbon (C), thorium (Th), scandium (Sc), titanium (Ti), vanadium (V), phosphorus (P), barium (Ba), europium (Eu), or combinations thereof.

Also disclosed are devices that include a near field transducer (NFT), the NFT having at least one external surface and the NFT including gold (Au); and at least one multilayer adhesion layer positioned on at least a portion of the at least one external surface, the multilayer adhesion layer including a first layer and a second layer, with the second layer being in contact with the portion of the at least one external surface of the NFT, the first layer including: yttrium (Y), scandium (Sc), zirconium (Zr), hafnium (Hf), silicon (Si), boron (B), tantalum (Ta), barium (Ba), aluminum (Al), titanium (Ti), niobium (Nb), calcium (Ca), beryllium (Be), strontium (Sr), magnesium (Mg), lithium (Li), or combinations thereof; and the second layer including: lanthanum (La), boron (B), lutetium (Lu), aluminum (Al), deuterium (D), cerium (Ce), uranium (U), praseodymium (Pr), yttrium (Y), silicon (Si), iridium (Ir), or combinations thereof.

Also disclosed are devices that include a near field transducer (NFT), the NFT having at least one external surface and the NFT including rhodium (Rh); and at least one multilayer adhesion layer positioned on at least a portion of the at least one external surface, the multilayer adhesion layer including a first layer and a second layer, with the second layer being in contact with the portion of the at least one external surface of the NFT, the first layer including: yttrium (Y), scandium (Sc), zirconium (Zr), hafnium (Hf), silicon (Si), boron (B), tantalum (Ta), barium (Ba), aluminum (Al), titanium (Ti), niobium (Nb), calcium (Ca), beryllium (Be), strontium (Sr), magnesium (Mg), lithium (Li), or combinations thereof; and the second layer including: carbon (C), lanthanum (La), cerium (Ce), uranium (U), thorium (Th), yttrium (Y), scandium (Sc), silicon (Si), titanium (Ti), vanadium (V), phosphorus (P), barium (Ba), europium (Eu), or combinations thereof.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

FIG. 3 is a cross sectional view of a portion of a disclosed device.

FIG. 4 is a perspective view of a particular type of NFT.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Heat assisted magnetic recording (referred to through as HAMR) utilizes radiation, for example from a laser, to heat media to a temperature above its curie temperature, enabling magnetic recording. In order to deliver the radiation, e.g., a laser beam, to a small area (on the order of 20 to 50 nm for example) of the medium, a NFT is utilized. During a magnetic recording operation, the NFT absorbs energy from a laser and focuses it to a very small area; this can cause the temperature of the NFT to increase. The temperature of the NFT can be elevated up to about 400° C. or more.

In some embodiments, a NFT can include a small peg and a large disk. The very high temperatures that the NFT reaches during operation can lead to diffusion of the material of the NFT (for example gold) from the peg and towards the disk. This can lead to deformation and recession of the peg, which can lead to failure of the NFT and the entire head.

Disclosed devices include one or more layers adjacent one or more surfaces of the peg of the NFT to increase or improve adhesion of the peg material to the surrounding materials or structures within the device. If the peg is better adhered to the surrounding materials or structures, it will be less likely to deform and/or recess.

Figure 1:
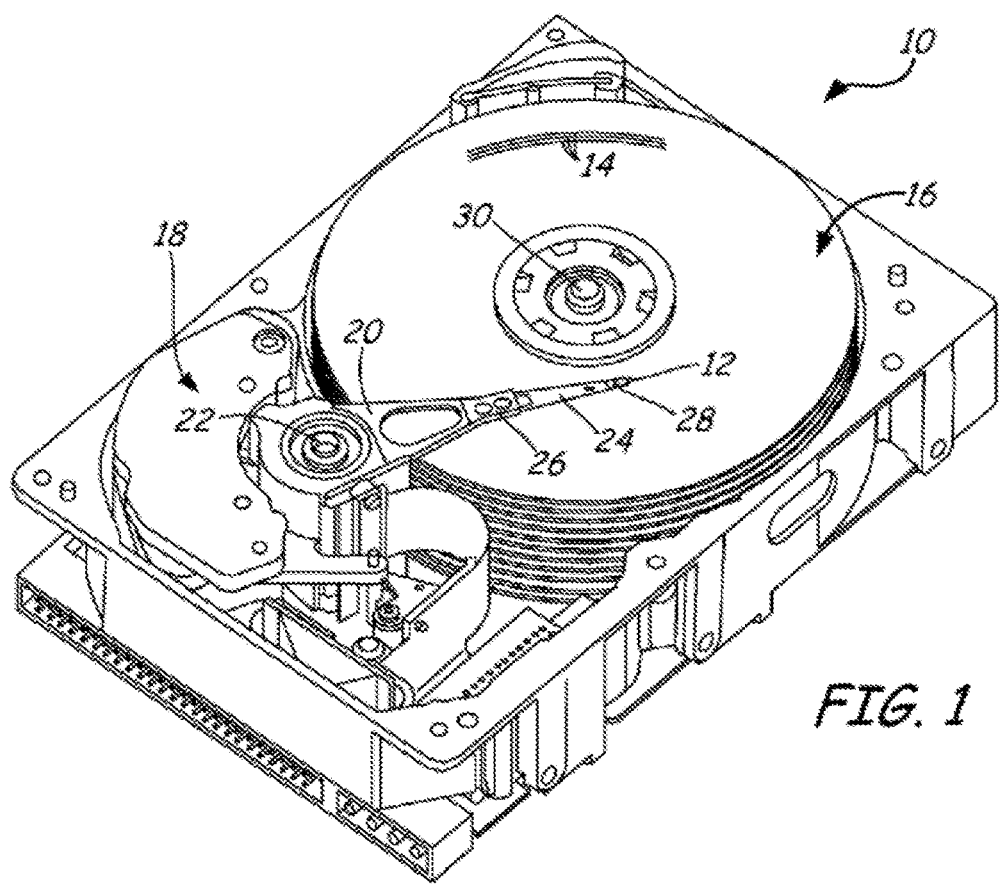
FIG. 1 is a perspective view of a magnetic disc drive that can include HAMR devices.

FIG. 1 is a perspective view of disc drive 10 including an actuation system for positioning slider 12 over track 14 of magnetic medium 16. The particular configuration of disc drive 10 is shown for ease of description and is not intended to limit the scope of the present disclosure in any way. Disc drive 10 includes voice coil motor 18 arranged to rotate actuator arm 20 on a spindle around axis 22. Load beam 24 is connected to actuator arm 20 at head mounting block 26. Suspension 28 is connected to an end of load beam 24 and slider 12 is attached to suspension 28. Magnetic medium 16 rotates around an axis 30, so that the windage is encountered by slider 12 to keep it aloft a small distance above the surface of magnetic medium 16. Each track 14 of magnetic medium 16 is formatted with an array of data storage cells for storing data. Slider 12 carries a magnetic device or transducer (not shown in FIG. 1) for reading and/or writing data on tracks 14 of magnetic medium 16. The magnetic transducer utilizes additional electromagnetic energy to heat the surface of medium 16 to facilitate recording by a process termed heat assisted magnetic recording (HAMR).

Figure 2:
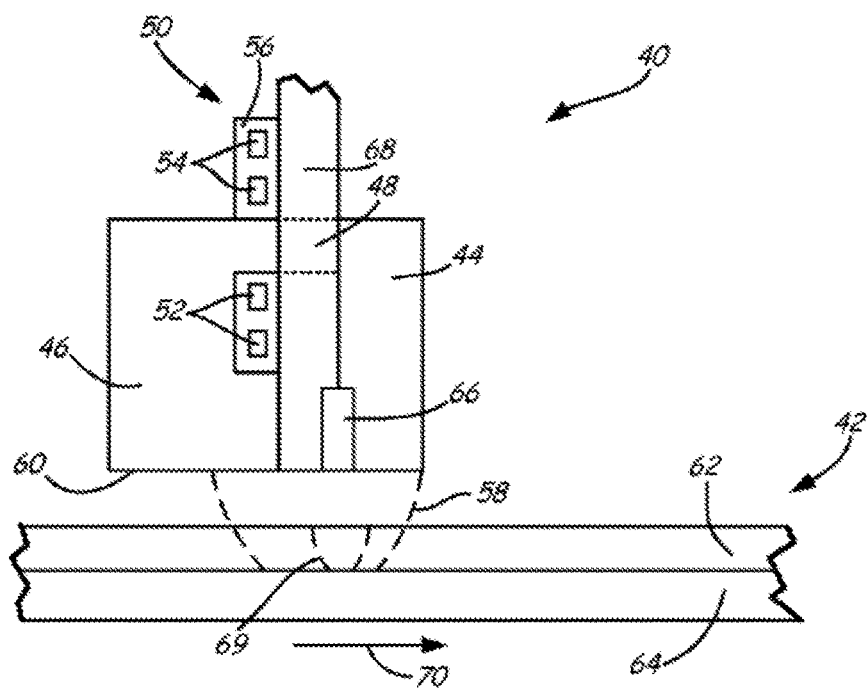
FIG. 2 is a cross sectional view of a perpendicular HAMR magnetic recording head and of an associated recording medium.

A HAMR transducer includes a magnetic writer for generating a magnetic field to write to a magnetic medium (e.g. magnetic medium 16) and an optical device to heat a portion of the magnetic medium proximate to the write field. FIG. 2 is a cross sectional view of a portion of a magnetic device, for example a HAMR magnetic device 40 and a portion of associated magnetic storage medium 42. HAMR magnetic device 40 includes write pole 44 and return pole 46 coupled by pedestal 48. Coil 50 comprising conductors 52 and 54 encircles the pedestal and is supported by an insulator 56. As shown, magnetic storage medium 42 is a perpendicular magnetic medium comprising magnetically hard storage layer 62 and soft magnetic underlayer 64 but can be other forms of media, such as patterned media. A current in the coil induces a magnetic field in the pedestal and the poles. Magnetic flux 58 exits the recording head at air bearing surface (ABS) 60 and is used to change the magnetization of portions of magnetically hard layer 62 of storage medium 42 enclosed within region 58. Near field transducer 66 is positioned adjacent the write pole 44 proximate air bearing surface 60. Near field transducer 66 is coupled to waveguide 68 that receives an electromagnetic wave from an energy source such as a laser. An electric field at the end of near field transducer 66 is used to heat a portion 69 of magnetically hard layer 62 to lower the coercivity so that the magnetic field from the write pole can affect the magnetization of the storage medium.

Devices disclosed herein can also include other structures. Devices disclosed herein can be incorporated into larger devices. For example, sliders can include devices as disclosed herein. Exemplary sliders can include a slider body that has a leading edge, a trailing edge, and an air bearing surface. The write pole, read pole, optical near field transducer and contact pad (and optional heat sink) can then be located on (or in) the slider body. Such exemplary sliders can be attached to a suspension which can be incorporated into a disc drive for example. It should also be noted that disclosed devices can be utilized in systems other than disc drives such as that depicted in FIG. 1.

FIG. 3 shows a cross section of a device taken perpendicular to the air bearing surface (ABS). The device includes a write pole 340, a waveguide core 320, optical cladding 350 and a NFT 330. Between the NFT 330 and the optical cladding 350 is an adhesion layer 335. The embodiment depicted in FIG. 3 shows the adhesion layer 335 located around portions of the peg 331 and the disc 332. In some embodiments, the adhesion layer 335 can be located on different surfaces of the NFT 330. In some embodiments, the adhesion layer 335 can be located adjacent the peg of the NFT only, adjacent the disc of the NFT only, or adjacent both the peg and the disc of the NFT. In some embodiments, the adhesion layer 335 can be located adjacent only surfaces of the peg of the NFT.

FIG. 4 shows an example of a peg and disc of a peg and disc type NFT. The NFT in FIG. 4 includes a peg 305 and a disc 310. The peg 305 includes five surfaces that are not in contact with the disc 310, an air bearing surface 306, a first surface 307, a second surface 309, a third surface 308, and a fourth surface 311. The disc 310 includes a top surface 315, a side surface 313 and a bottom surface 312. Because the exemplary disc 310 is circular, the side surface 313 is depicted as a single continuous surface, but it should be understood that this need not be the case.

In some embodiments, the second surface 309 and the first surface 307 are facing the pole and core respectively. In some embodiments, the third surface 308 and the fourth surface 311 are not facing the pole or the core. More specifically, the third surface 308 would be located in front of the paper on which FIG. 2 is depicted and the fourth surface 311 would be located behind the paper on which FIG. 2 is depicted. In some embodiments, the second surface 309 can also be referred to as the NFT-pole surface which faces a NFT-pole space, which can be referred to as a NPS (not shown herein). In some embodiments, the first surface 307 can also be referred to as the NFT-core surface, which faces a NFT-core space, which can be referred to as CNS (not shown herein). In some embodiments, the third surface 308 can also be described as the surface which faces the left side of a device, in some embodiments; a left solid immersion mirror can be located there. In some embodiments, the fourth surface 311 can also be described as the surface which faces the right side of a device, in some embodiments; a right solid immersion mirror can be located there.

Disclosed devices can include one or more adhesion layers located on one or more surfaces of a NFT. In some embodiments, disclosed devices can include one or more adhesion layers located on one or more surfaces of a peg of a NFT. In some embodiments, disclosed devices can include one or more adhesion layers located on one or more surfaces of a disc of a NFT. In some embodiments, disclosed devices can include adhesion layers located on two or more surfaces of a peg of a NFT. In some embodiments, disclosed devices can include adhesion layers located on three or more surfaces of a peg of a NFT. In some embodiments, disclosed devices can include adhesion layers located on four or more surfaces of a peg of a NFT. In some embodiments, disclosed devices can include adhesion layers located on all five surfaces of a peg of a NFT. In some embodiments disclosed devices can include adhesion layers located on each of the first surface 307, the second surface 309, the third surface 308, and the fourth surface 311. In some embodiments, disclosed devices can include adhesion layers located on the air bearing surface 306, the first surface 307, the second surface 309, the third surface 308, and the fourth surface 311 of the peg 306, and the side surface 313 and the top surface 315 of the disc 310. In some embodiments, adhesion layers on different surfaces of the peg could have different materials. In some embodiments, the adhesion layer on one or more surfaces could be different in order to reduce the optical penalty. In some embodiments, the adhesion layer on one or more surfaces could be different in order to tailor particular properties at specific interfaces.

Figure 5:
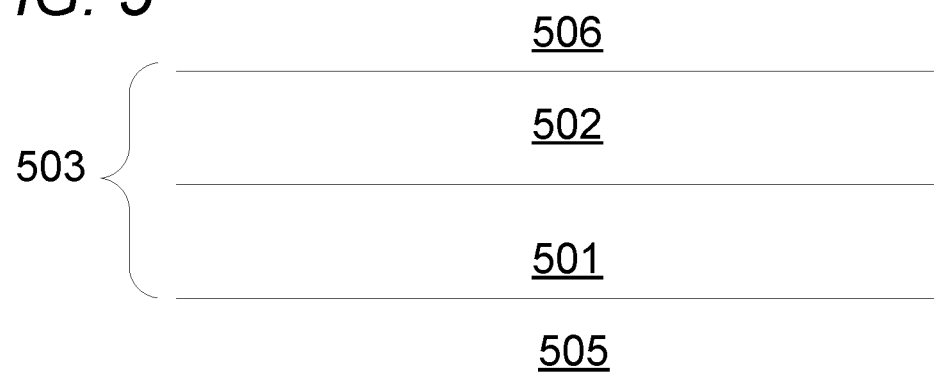
FIG. 5 is a cross section view of a portion of a disclosed device depicting the relative locations of the first and second layer of a multilayer adhesion layer.

Adhesion layers disclosed herein are multilayer adhesion layers. Such adhesion layers can include at least two layers. In some embodiments, a first layer in contact with a non-NFT structure and a second layer in contact with some portion of a NFT. The first layer and the second layer are in contact with each other. As such this portion of the device can be described as including a non-NFT structure (e.g., a dielectric material or dielectric material containing structure), a first layer of a multilayer adhesion layer adjacent to or even in contact with the non-NFT structure, a second layer of a multilayer adhesion layer adjacent to or even in contact with the first layer, and some portion of a NFT adjacent to or even in contact with the second layer. This portion of a device is depicted in FIG. 5, with the non-NFT structure depicted as 505, the first layer 501, the second layer 502, and the NFT structure 506. The first layer may include more than one individual layer of the same or different materials, may have been deposited in more than one step using the same or a different process or procedure, or any combination thereof. The second layer may include more than one individual layer of the same or different materials, may have been deposited in more than one step using the same or a different process or procedure, or any combination thereof.

In some embodiments, the first layer can be designed to, configured to, or chosen to bond well with the non-NFT structure. This layer may also serve to minimize or even prevent diffusion of material from the non-NFT structure, material from structures beyond the principally adjacent non-NFT structure, or some combination thereof into the NFT itself. In some embodiments, this layer may serve to minimize or even prevent diffusion along the NFT-non NFT interface. Diffusion along such an interface can include diffusion of the NFT atoms, oxygen diffusion, or otherwise for example. In some embodiments, the first layer can also be designed to, configured to, or chosen to bond well with the second layer. In some embodiments, the second layer can be designed to, configured to, or chosen to bond well with the NFT. This layer may also serve to minimize or even prevent recession of the peg (part of the NFT) away from the ABS during operation of the device. This layer may also serve to minimize or even prevent grain rotation in the material of the peg. In some embodiments, the second layer can also be designed to, configured to, or chosen to bond well with the first layer. The second layer may also serve to minimize or even prevent diffusion of material from the non-NFT structure, material from structures beyond the principally adjacent non-NFT structure, or some combination thereof into the NFT itself. In some specific embodiments, the second layer may serve to minimize or even prevent diffusion along the NFT-non NFT interface.

In some embodiments, disclosed first layers can include one or more materials that have relatively high bond strengths to the non-NFT structure. In some embodiments, the non-NFT structure can include a dielectric material. This dielectric material can be part of the NPS or the CNS for example. In such embodiments, the first layer can include one or more materials that have relatively high bond strengths to dielectric materials, which are often oxides. Table 1 shows a number of elements, their bond dissociation energy to oxygen (in kJ/mol), the difference in their bond dissociation energy to oxygen versus gold (in kJ/mol as an example of a NFT material; this property may be an indication of relative bonding to the oxide versus the NFT material—if bonding to the oxide is not good enough, the material of the first layer may be pulled away along with the NFT material if recession of the peg occurs), their free energy of oxide formation at 500° K (in kJ/mol), their bond dissociation energy to gold (in kJ/mol as an example of a NFT material), a ranking (1 to 5, with 1 being worst and 5 being best) of their bond dissociation properties, a ranking (1 to 5, with 1 being worst and 5 being best) of their free energy properties, the sum of the two rankings (2 to 9, with 2 being worst and 9 being best) and a percentile ranking of the efficacy of the element based on these properties (higher % being a better choice based on these properties). The percentile ranking assumes an equal weighting of bond strength to oxygen and free energy of oxide formation.

TABLE 1

| Element | Bond Dissociation Energy to O (kJ/mol) | Δ in Bond Dissociation Energy to O and Au (kJ/mol) | Free Energy of Oxide Formation (kJ/mol) | Bond Dissociation Energy to Au (kJ/mol) | Bond Dissociation Rank | Free Energy Rank | Sum | Percentile (%) |
|---|---|---|---|---|---|---|---|---|
| Y  | 714.1   | 491.1  | −1170 | 310   | 4 | 5 | 9 | 92 |
| Sc | 671.4   | 448.4  | −1170 | 280   | 4 | 5 | 9 | 92 |
| Zr | 766.1   | 543.1  | −1000 |       | 4 | 5 | 9 | 92 |
| Hf | 801     | 578    | −975  |       | 5 | 4 | 9 | 92 |
| Si | 799.6   | 576.6  | −820  | 304.6 | 5 | 4 | 9 | 92 |
| B  | 809     | 586    | −750  | 367.8 | 5 | 4 | 9 | 92 |
| Ta | 839     | 616    | −725  |       | 5 | 4 | 9 | 91 |
| Ba | 562     | 339    | −1020 | 254.8 | 3 | 5 | 8 | 88 |
| Al | 501.9   | 278.9  | −1020 | 325.9 | 3 | 5 | 8 | 88 |
| Ti | 666.5   | 443.5  | −955  |       | 4 | 4 | 8 | 88 |
| Nb | 726.5   | 503.5  | −745  |       | 4 | 4 | 8 | 87 |
| Ca | 383.3   | 160.3  | −1170 | 250.4 | 2 | 5 | 7 | 89 |
| Be | 437     | 214    | −1120 | 237.7 | 2 | 5 | 7 | 89 |
| Sr | 426.3   | 203.3  | −1100 | 564   | 2 | 5 | 7 | 89 |
| Mg | 358.2   | 135.2  | −1095 | 179.1 | 2 | 5 | 7 | 89 |
| P  | 589     | 366    | −710  |       | 3 | 4 | 7 | 80 |
| W  | 720     | 497    | −500  |       | 4 | 3 | 7 | 79 |
| C  | 1076.38 | 853.38 | −395  |       | 5 | 2 | 7 | 77 |
| Li | 340.5   | 117.5  | −1075 | 284.5 | 1 | 5 | 6 | 88 |
| Mn | 362     | 139    | −700  | 197.7 | 2 | 4 | 6 | 77 |
| Mo | 502     | 279    | −500  |       | 3 | 3 | 6 | 75 |
| Ge | 657.5   | 434.5  | −480  | 273.2 | 4 | 2 | 6 | 75 |
| Na | 270     | 47     | −800  | 215.1 | 1 | 4 | 5 | 71 |
| Cr | 461     | 238    | −650  | 223.7 | 2 | 3 | 5 | 67 |

Based on Table 1, in some embodiments a first layer of a multilayer adhesion layer, in a device can include yttrium (Y), scandium (Sc), zirconium (Zr), hafnium (Hf), silicon (Si), boron (B), tantalum (Ta), barium (Ba), aluminum (Al), titanium (Ti), niobium (Nb), calcium (Ca), beryllium (Be), strontium (Sr), magnesium (Mg), lithium (Li), or any combination thereof. In some embodiments, a first layer of a multilayer adhesion layer can include Y, Sc, Zr, Hf, Si, B, Ta, or any combination thereof. In some embodiments, a first layer of a multilayer adhesion layer can include Y, Sc, Zr, Hf, Si, B, Ta, Ba, Al, Ti, Nb or any combination thereof. In some embodiments, a first layer of a multilayer adhesion layer can include Ba.

In some embodiments, disclosed second layers can include one or more materials that have relatively high bond strengths to the NFT structure, the majority material of the NFT, the majority material of the relevant portion of the NFT, or some combination thereof. In some embodiments, various materials including, for example, gold (Au), silver (Ag), copper (Cu), rhodium (Rh), alloys thereof, or other materials can be utilized to form a NFT. In some embodiments, the NFT can also be made of materials listed in U.S. Patent Publication No. 2013/0286799, U.S. Pat. No. 8,427,925, and U.S. patent application Ser. No. 13/923,925 entitled MAGNETIC DEVICES INCLUDING FILM STRUCTURES, filed on Jun. 21, 2013, and Ser. No. 14/062,651 entitled RECORDING HEADS INCLUDING NFT AND HEATSINK, filed on Oct. 24, 2013, the disclosures of which are incorporated herein by reference thereto.

In an illustrative embodiment, where the relevant portion of the NFT (e.g, the peg for example) comprises a majority of gold (Au), the second layer can include one or more materials that have a relatively high bond strength to gold. Table 2 below shows bond dissociation energies of various elements with gold. A higher bond dissociation energy may indicate a material that would be more likely to maintain a relatively strong bond with gold.

TABLE 2

| Element | Bond Energy to Au (kJ/mol) | Element | Bond Energy to Au (kJ/mol) | Element | Bond Energy to Au (kJ/mol) |
|---|---|---|---|---|---|
| La | 457 | B | 367.8 | Lu | 332 |
| Al | 325.9 | D | 322.2 | Ce | 322 |
| U | 318 | C | 311.5 | Pr | 311 |
| Y | 310 | Si | 304.6 | H | 300.5 |
| Er | 300 | F | 294.1 | Nd | 294 |
| Bi | 293 | Ga | 290 | In | 286 |
| Tb | 285 | Sc | 280 | Cl | 280 |
| I | 276 | Ge | 273.2 | Ho | 267 |
| Sr | 264 | Dy | 259 | Sn | 256.5 |
| Ba | 254.8 | S | 253.6 | Cs | 253 |
| Se | 251 | Ca | 250.4 | Ni | 247 |
| V | 246 | Eu | 245 | Rb | 243 |
| Be | 237.7 | Te | 237.2 | Rh | 232.6 |
| Cu | 227.1 | Au | 226.2 | Cr | 223.7 |
| O | 223 | Co | 218 | Na | 215.1 |
| Br | 213 | Ag | 202.5 | Mn | 197.7 |
| Fe | 187 | Mg | 179.1 | Pd | 142.7 |
| Pb | 133 | LI | 4.5 | | |

Based on Table 2, in some embodiments a second layer of a multilayer adhesion layer, in a device where a NFT includes Au, a majority of Au, or the relevant portion (e.g., the peg for example) includes a majority of Au, or a combination thereof can include, for example lanthanum (La), boron (B), lutetium (Lu), aluminum (Al), deuterium (D), cerium (Ce), uranium (U), praseodymium (Pr), yttrium (Y), silicon (Si), or combinations thereof. In some embodiments, the solubility of the element in the NFT material (e.g., Au) can be considered, the free energy of oxide formation, or any combination thereof can be considered. In some embodiments, a second layer of a multilayer adhesion layer, in a device where a NFT includes Au, a majority of Au, or the relevant portion (e.g., the peg for example) includes a majority of Au, or a combination thereof can include, for example iridium (Ir).

In an illustrative embodiment, where the relevant portion of the NFT (e.g, the peg for example) comprises a majority of rhodium (Rh), some portion of Rh, or a minority of Rh, the second layer can include one or more materials that have a relatively high bond strength to rhodium. Table 3 below shows bond dissociation energies of various elements with rhodium. A higher bond dissociation energy may indicate a material that would be more likely to maintain a relatively strong bond with rhodium.

TABLE 3

| Element | Bond Energy to Rh (kJ/mol) | Element | Bond Energy to Rh (kJ/mol) | Element | Bond Energy to Rh (kJ/mol) |
|---|---|---|---|---|---|
| C | 580 | La | 550 | Ce | 545 |
| U | 519 | Th | 513 | Y | 446 |
| Sc | 444 | O | 405 | Si | 395 |
| Ti | 390.8 | V | 364 | P | 353.1 |
| Ba | 259.4 | H | 241 | Eu | 238 |
| Rh | 235.85 | | | | |

Based on Table 3, in some embodiments a second layer of a multilayer adhesion layer, in a device where a NFT includes Rh, a majority of Rh, a minority of Rh, or the relevant portion (e.g., the peg for example) includes some amount of Rh, or a combination thereof can include, for example carbon (C), lanthanum (La), cerium (Ce), uranium (U), thorium (Th), yttrium (Y), scandium (Sc), titanium (Ti), vanadium (V), phosphorus (P), barium (Ba), europium (Eu), or combinations thereof.

When selecting materials for the first layer and the second layer, interactions of the two materials can also be considered. Table 4 shows bond energies between some illustrative materials for a first layer and some illustrative materials for a second layer.

TABLE 4

| | | Illustrative second layer Materials | | | | | | | |
|---|---|---|---|---|---|---|---|---|---|
| | | La | B | Lu | Al | D | Ce | Pr | Y | Si |
| Illustrative First Layer Materials | Y | 197 | 289 | | | | | | 270 | 258 |
| | Sc | | 272 | | | | | | | 227.2 |
| | Zr | | | | | | | | | |
| | Hf | | | | | | | | | |
| | Si | | 317 | | 246.9 | 302.5 | | | 258 | 310 |
| | B | 335 | 290 | | | 341 | 305 | | 289 | 317 |
| | Ta | | | | | | | | | |
| | Ba | | | | | 193 | | | | |
| | Al | | | | 264.3 | | | | | 246.9 |
| | Ti | | 272 | | 263.4 | | | | | |
| | Nb | | | | | | | | | |

Based on Table 4, in some embodiments where some portion of a NFT includes a majority of Au, a first layer can include yttrium (Y) and a second layer can include lanthanum (La); a first layer can include yttrium (Y) and a second layer an include boron (B); a first layer can include scandium (Sc) and a second layer an include boron (B); a first layer can include silicon (Si) and a second layer an include boron (B); a first layer can include silicon (Si) and a second layer can include aluminum (Al); a first layer can include aluminum (Al) and a second layer can include silicon (Si); a first layer can include titanium (Ti) and a second layer can include aluminum (Al); a first layer can include yttrium (Y) and a second layer can include yttrium (Y); a first layer can include yttrium (Y) and a second layer can include silicon (Si); or a first layer can include silicon (Si) and a second layer can include yttrium (Y).

In some embodiments, materials of the first layer, the second layer, or both can be selected based on properties other than any of those discussed above. In some embodiments, materials of the first layer, the second layer, or both can be selected based on considerations including having the first and the second layer address and consider the interfaces present, e.g., an oxide present adjacent the first layer and a NFT material (e.g., Au, Ag, Cu, Rh, etc.) present adjacent the second layer. In some embodiments, a first layer can include yttrium (Y), and a second layer can include iridium (Ir).

In some embodiments, an optional third layer can also be utilized. The optional third layer is between the first and second layer and can serve to increase or enhance the adhesion between the first and second layers of the multilayer adhesion layers. The optional third layer can include material combinations presented in Table 4, material combinations not presented in Table 4, or any combinations thereof.

Disclosed multilayer adhesion layers can have thicknesses that allow them to function as intended (bind both adjacent materials) but not detrimentally affect the functioning of the NFT itself. In some embodiments, a multilayer adhesion layer can be not less than 5 Å thick, while in some embodiments a multilayer adhesion layer can be not less than 1 nm thick, and in some embodiments a multilayer adhesion layer can be not less than 1.5 nm thick. In some embodiments, a multilayer adhesion layer can be not greater than 5 nm thick, while in some embodiments a multilayer adhesion layer can be not greater than 3 nm thick, and in some embodiments a multilayer adhesion layer can be not greater than 2 nm thick. The individual layers (a first layer and a second layer) may have the same or different thicknesses. In some embodiments, a first layer can be not less than 2.5 Å thick, not less than 5 Å thick, or in some embodiments not less than 1 nm thick. In some embodiments, a first layer can be not greater than 2.5 nm thick, not greater than 1.5 nm, or not greater than 1 nm thick. In some embodiments, a second layer can be not less than 2.5 Å thick, not less than 5 Å thick or in some embodiments not less than 1 nm thick. In some embodiments, a second layer can be not greater than 2.5 nm thick, not greater than 1.5 nm thick, or not greater than 1 nm thick.

It should be noted that an adhesion layer, any individual layer thereof, or any combination thereof need not have a constant thickness. This may occur, for example, in instances where the deposition method, the underlying geometry, or both does not afford substantially conformal deposition. In such instances, one or more layers may be thicker in some areas and thinner in other areas. For example, an adhesion layer (or a sublayer thereof) may be thicker on the top of the peg and thinner on the sidewalls of the peg. A thickness of any layer may refer to the average thickness of the layer.

Figure 6:
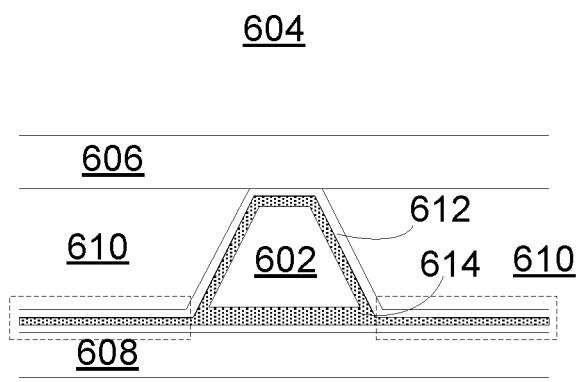
FIG. 6 is a view looking at the air bearing surface (ABS) of a disclosed device that includes a multilayer adhesion layer.

In some embodiments, disclosed multilayer adhesion layers can be utilized on at least one surface of a portion of the NFT. More specifically, in some embodiments disclosed multilayer adhesion layers can be utilized on at least one surface of a peg of a NFT. In some embodiments, disclosed multilayer adhesion layers can be utilized on more than one surface of a peg of NFT. FIG. 6A shows a portion of a device, looking from the air bearing surface (ABS) towards the device. The device includes a peg 602, a write pole 604, a NFT to pole space (NPS) 606, a core to NFT space (CNS) 608 and cladding 610. All of the NPS, CNS and cladding can be made of one or more dielectric materials. An illustrative embodiment can include a multilayer adhesion layer on at least the first surface, the second surface, the third surface and the fourth surface (see for example FIG. 4). Such a multilayer adhesion layer can include a first layer 612 that is in contact with the dielectric materials (e.g. the NPS 606, the CNS 608 and the cladding 610) and a second layer 614 that is in contact with the peg 602. In some embodiments, the angle of the sidewall(s) of the peg can be from about 30° to about 45°. Angles such as these can provide relatively good coverage and conformality of the layers of the adhesion layers. The tails (indicated by the dashed box in FIG. 6) on the first 612 and the second 614 layers may or may not be present. In some embodiments, the tails may be present because it may be easier, from a processing perspective, to leave them in the device.

One of skill in the art, having read this specification will understand that NFT types other than peg and disk (also referred to as "lollipop" type NFTs) could be utilized herein. For example plasmonic gap type NFTs and peg only NFTs can also be utilized.

In some embodiments, materials that can be utilized for adhesion layers can be those that provide acceptable levels of NFT coupling efficiency loss. Such materials can generally have relatively high indices of refraction (n). The presence of a non-plasmonic material layer, e.g., a disclosed adhesion layer in some embodiments, at the interface of the NFT material and the cladding material layer can "dampen" the ability of that interface to support surface plasmons, which can result in weaker electric field emission from the NFT. Such materials may also have relatively favorable k values. In some embodiments, materials that are more highly detrimental from an optical standpoint can be utilized at relatively smaller thicknesses, for example.

Methods of making devices including disclosed multilayer adhesion layers can vary depending on the location of the multilayer adhesion layer. In embodiments where one or more multilayer adhesion layers are being utilized on the first surface 307, the third surface 308, the fourth surface 311, or any combination thereof, the materials of the multilayer adhesion layer(s) can be deposited, then the NFT material can be deposited, followed by the cladding or dielectric material. The multilayer adhesion layer(s) then affects adhesion between the underlying dielectric material (for example the cladding layers or dielectric layers) and the NFT. In embodiments where a multilayer adhesion layer is utilized on the second surface 309, the materials of the multilayer adhesion layer material can be deposited on the NFT material after it is deposited, for example in a trench (either lined with disclosed multilayer adhesion layer material or not). The multilayer adhesion layer on the second surface 309 then affects adhesion between the NFT material and the overlying dielectric material (for example the top cladding layer). In some embodiments, a multilayer adhesion layer material can be deposited on a NFT material layer. This structure can then be trimmed in order to form a peg (from the NFT material layer) with a multilayer adhesion layer on the first surface 307 of the peg. Next, a multilayer adhesion layer can be formed on the third surface 308, the fourth surface 311 and the second surface 309. Excess multilayer adhesion layer material can then optionally be removed from the structure.

Illustrative processes for forming disclosed multilayer adhesion layers can include for example, deposition methods such as chemical vapor deposition (CVD) such as plasma enhanced chemical vapor deposition (PECVD), physical vapor deposition (PVD), atomic layer deposition (ALD) such as plasma enhanced atomic layer deposition (PEALD), solution methods such as plating (e.g., electroplating), sputtering methods, cathodic arc deposition methods, ion implantation method and evaporative, ion beam deposition (IBD) methods.

Processes to form the multilayer adhesion layer could be easily integrated into the overall manufacturing process of the device. Overall, the use of disclosed multilayer adhesion layers would decrease or eliminate yield loss due to delamination of the NFT and contribute to increased NFT lifetime during the operation of the magnetic device with very little effect on current formation processes for the device.

The present disclosure is illustrated by the following examples. It is to be understood that the particular examples, assumptions, modeling, and procedures are to be interpreted broadly in accordance with the scope and spirit of the disclosure as set forth herein.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

As used herein, "about" or "approximately" shall generally mean within 20 percent, within 10 percent, or within 5 percent of a given value or range. "about" can also in some embodiments imply a range dictated by a means of measuring the value at issue. Other than in the examples, or where otherwise indicated, all numbers are to be understood as being modified in all instances by the term "about".

Thus, embodiments of devices including at least one multilayer adhesion layer are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A device comprising:
a near field transducer (NFT), the NFT having at least one external surface; and
at least one multilayer adhesion layer positioned on at least a portion of the at least one external surface, the multilayer adhesion layer comprising a first layer and a second layer, with the first layer and the second layer in contact with each other and with the second layer being in contact with the portion of the at least one external surface of the NFT,
the first layer comprising: yttrium (Y), scandium (Sc), zirconium (Zr), hafnium (Hf), silicon (Si), boron (B), tantalum (Ta), barium (Ba), aluminum (Al), titanium (Ti), niobium (Nb), calcium (Ca), beryllium (Be), strontium (Sr), magnesium (Mg), lithium (Li), or combinations thereof; and
the second layer comprising: lanthanum (La), boron (B), lutetium (Lu), aluminum (Al), deuterium (D), cerium (Ce), uranium (U), praseodymium (Pr), yttrium (Y), silicon (Si), iridium (Ir), carbon (C), thorium (Th), scandium (Sc), titanium (Ti), vanadium (V), phosphorus (P), barium (Ba), europium (Eu), or combinations thereof.

2. The device according to claim 1, wherein the first and the second layer comprise different materials.

3. The device according to claim 1, wherein the NFT comprises a disc and a peg, wherein the peg has five surfaces thereof, a first surface, a second surface, a third surface, a fourth surface and a fifth surface, wherein the fifth surface is at the air bearing surface (ABS) of the device.

4. The device according to claim 3, wherein the multilayer adhesion layer is not present on the fifth surface of the peg.

5. The device according to claim 1, wherein the first layer comprises Y, Sc, Zr, Hf, Si, B, Ta, or any combination thereof.

6. The device according to claim 1, wherein the first layer comprises Y, Sc, Zr, Hf, Si, B, Ta, Ba, Al, Ti, Nb, or any combination thereof.

7. The device according to claim 1, wherein the first layer comprises Ba.

8. The device according to claim 1, wherein the NFT comprises gold (Au) or an alloy thereof.

9. The device according to claim 8, wherein the second layer comprises La, B, Lu, Al, D, Ce, U, Pr, Y, Si, or combinations thereof.

10. The device according to claim 8, wherein the second layer comprises Ir.

11. The device according to claim 8, wherein the first layer comprises Y and the second layer comprises La; the first layer comprises Y and the second layer comprises B; the first layer comprises Sc and the second layer comprises B; the first layer comprises Si and the second layer comprises B; the first layer comprises Si and the second layer comprises Al; the first layer comprises Al and the second layer comprises Si; the first layer comprises Ti and the second layer comprises Al; the first layer comprises Y and the second layer comprises Y; the first layer comprises Y and the second layer comprises Si; the first layer comprises Si and the second layer comprises Y; or the first layer comprises Y and the second layer comprises Ir.

12. The device according to claim 1, wherein the NFT comprises rhodium (Rh), or an alloy thereof.

13. The device according to claim 12, wherein the second layer comprises C, La, Ce, U, Th, Y, Sc, Si, Ti, V, P, Ba, Eu, or combinations thereof.

14. The device according to claim 1, wherein the multilayer adhesion layer has an average thickness from 5 Å to 5 nm.

15. A device comprising:
- a near field transducer (NFT), the NFT having at least one external surface and the NFT comprising gold (Au); and
- at least one multilayer adhesion layer positioned on at least a portion of the at least one external surface, the multilayer adhesion layer comprising a first layer and a second layer, with the first layer and the second layer in contact with each other and with the second layer being in contact with the portion of the at least one external surface of the NFT,
- the first layer comprising: yttrium (Y), scandium (Sc), zirconium (Zr), hafnium (Hf), silicon (Si), boron (B), tantalum (Ta), barium (Ba), aluminum (Al), titanium (Ti), niobium (Nb), calcium (Ca), beryllium (Be), strontium (Sr), magnesium (Mg), lithium (Li), or combinations thereof; and
- the second layer comprising: lanthanum (La), boron (B), lutetium (Lu), aluminum (Al), deuterium (D), cerium (Ce), uranium (U), praseodymium (Pr), yttrium (Y), silicon (Si), iridium (Ir), or combinations thereof.

16. The device according to claim 15, wherein the second layer comprises Ir.

17. The device according to claim 15, wherein the first layer comprises Y and the second layer comprises La; the first layer comprises Y and the second layer comprises B; the first layer comprises Sc and the second layer comprises B; the first layer comprises Si and the second layer comprises B; the first layer comprises Si and the second layer comprises Al; the first layer comprises Al and the second layer comprises Si; the first layer comprises Ti and the second layer comprises Al; the first layer comprises Y and the second layer comprises Y; the first layer comprises Y and the second layer comprises Si; the first layer comprises Si and the second layer comprises Y; or the first layer comprises Y and the second layer comprises Ir.

18. A device comprising:
- a near field transducer (NFT), the NFT having at least one external surface and the NFT comprising rhodium (Rh); and
- at least one multilayer adhesion layer positioned on at least a portion of the at least one external surface, the multilayer adhesion layer comprising a first layer and a second layer, with the first layer and the second layer in contact with each other and with the second layer being in contact with the portion of the at least one external surface of the NFT,
- the first layer comprising: yttrium (Y), scandium (Sc), zirconium (Zr), hafnium (Hf), silicon (Si), boron (B), tantalum (Ta), barium (Ba), aluminum (Al), titanium (Ti), niobium (Nb), calcium (Ca), beryllium (Be), strontium (Sr), magnesium (Mg), lithium (Li), or combinations thereof; and
- the second layer comprising: carbon (C), lanthanum (La), cerium (Ce), uranium (U), thorium (Th), yttrium (Y), scandium (Sc), silicon (Si), titanium (Ti), vanadium (V), phosphorus (P), barium (Ba), europium (Eu), or combinations thereof.

19. The device according to claim 18, wherein the first layer comprises Y and the second layer comprises La; the first layer comprises Al and the second layer comprises Si; the first layer comprises Y and the second layer comprises Y; the first layer comprises Y and the second layer comprises Si; or the first layer comprises Si and the second layer comprises Y.

20. The device according to claim 18, wherein the multilayer adhesion layer has an average thickness from 5 Å to 5 nm.

* * * * *